United States Patent [19]

Arai et al.

[11] Patent Number: 4,547,808
[45] Date of Patent: Oct. 15, 1985

[54] PHOTOMETRIC CIRCUIT INCORPORATED IN OBJECTIVE PROVIDED WITH AUTOMATIC DIAPHRAGM FOR CLOSED CIRCUIT TELEVISION (CCTV) CAMERA

[75] Inventors: Masayuki Arai; Terumi Ogasawara; Tohru Shikano, all of Tokyo, Japan

[73] Assignee: Asahi Seimitsu Kabushiki Kaisha, Tokyo, Japan

[21] Appl. No.: 505,460

[22] Filed: Jun. 17, 1983

[30] Foreign Application Priority Data

Dec. 27, 1982 [JP] Japan .................................. 57-234113

[51] Int. Cl.$^4$ ............................................. H04N 5/26
[52] U.S. Cl. ................................................... 358/228
[58] Field of Search ................ 358/217, 209, 174, 228

[56] References Cited

U.S. PATENT DOCUMENTS

| 3,918,046 | 11/1975 | Rivers | 358/217 |
|---|---|---|---|
| 4,268,866 | 5/1981 | Rodgers, III | 358/228 |
| 4,300,167 | 11/1981 | Miller et al. | 358/210 |
| 4,451,851 | 5/1984 | Arai et al. | 358/228 |
| 4,472,743 | 9/1984 | Ogasawara et al. | 358/228 |

Primary Examiner—Gene Z. Rubinson
Assistant Examiner—Robert Lev
Attorney, Agent, or Firm—Birch, Stewart, Kolasch & Birch

[57] ABSTRACT

A control circuit for automatically opening and closing the diaphragm of the objective lens of a closed circuit television (CCTV) camera, including a variable gain inverting amplifier for amplifying and inverting video signals from the camera, a voltage doubler and rectifier coupled to the output of the inverting amplifier, a reference voltage generator, a diaphragm control assembly for comparing said reference voltage with signals output from said voltage doubler and opening and closing said diaphragm in response to the results of said comparison, and a series circuit including a clipping diode and variable resistor coupled between the input and output of the inverting amplifier. The clipping diode clips negative going portions of signals output from said inverting amplifier and adjustment of said variable resistor selects different light modes by controlling the degree of clipping.

3 Claims, 10 Drawing Figures

*Fig 1*
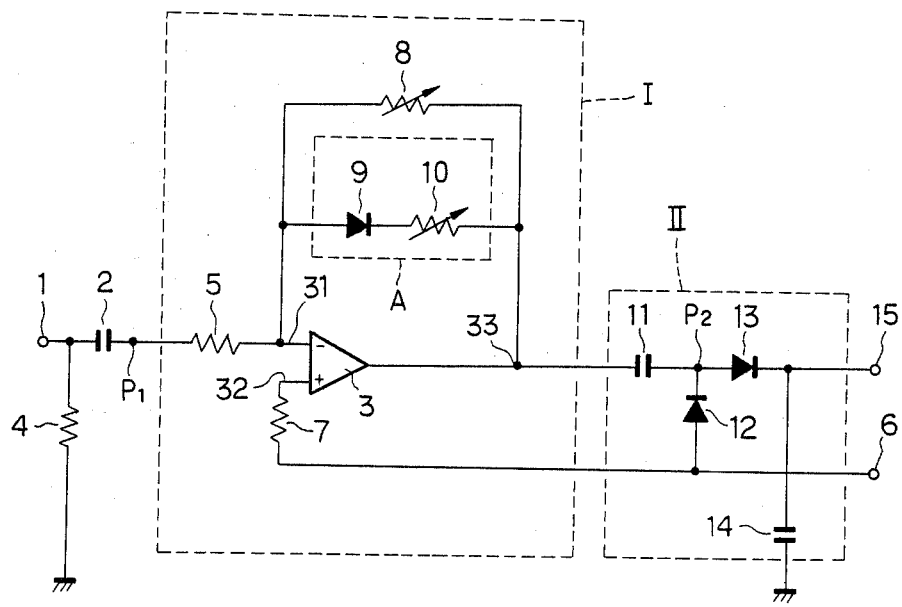
*Fig 2 (a)*
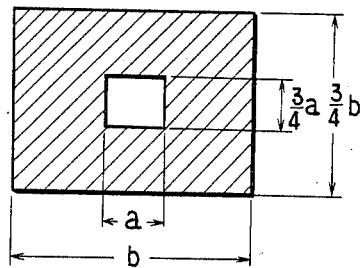
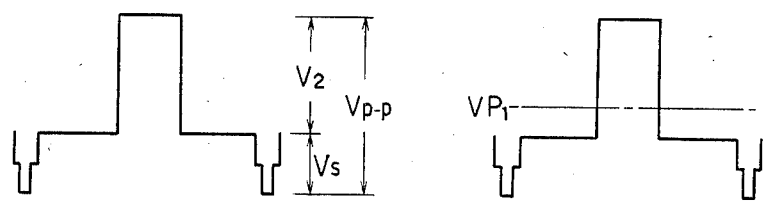
*Fig 3*
Fig. 2(b)

PHOTOMETRIC CIRCUIT INCORPORATED IN OBJECTIVE PROVIDED WITH AUTOMATIC DIAPHRAGM FOR CLOSED CIRCUIT TELEVISION (CCTV) CAMERA

BACKGROUND OF THE INVENTION

The present invention relates to a photometric circuit incorporated in an objective lens assembly including an automatic diaphragm for a closed circuit television (CCTV) camera.

In an objective lens assembly provided with an automatic diaphragm so arranged that the DC voltage obtained by rectifying video signals coming from the television camera are utilized as the control signals for diaphragm control to obtain the optimum image, the photometric circuit serving as means for detection of an object to be picked up is very important, since the photometric or light measuring mode for this objective lens depends on the capabilities of such a photometric circuit.

To obtain the optimum image, not only absolute brightness of an object to be picked up, but also light and shade ratios of different areas in the same object, i.e., contrast, are important factors to be considered. The contrast lies within a range of tens: one even in cloudy daylight and within a range of hundreds: one in cloudless daylight. In the image reproduced by a television, on the contrary, the contrast lies within a range as narrow as of 30 to 40:1. When a bright area and a dark area are simultaneously contained in the same object, therefore, it is necessary to decide whether said bright area is selected as the main object or said dark area is selected as the main object to be picked up, since it is impossible to see both areas at the same time.

In principle, a so-called average light measuring mode is suitable for the case in which the dark area is selected as the main object to be picked up, while a so-called peak light measuring mode is suitable for the case in which the bright area is selected as the main object to be picked up. These light measuring modes for a video system usually employ the video signals coming from the television camera to obtain a diaphragm control signal. However, rigid use of these light measuring modes would cause inconveniences. Specifically, in the case where the same object simultaneously contains the bright area and the dark area as previously mentioned, the average light measuring mode would often make the bright area a white solid area without any gradation while the peak light measuring mode would often make the dark area, which should be adequately discriminated, indiscriminate. The average average light measuring mode and the peak light measuring mode should be selectively adopted depending on whether the dark area or the bright area is used as the main object to be picked up when these two areas simultaneously exist in one and the same object to be picked up. Accordingly, it is preferred that a video signal of the same level is obtained regardless of the modes so far as the object contains no dark area, i.e., no contrast state is concerned.

In view of the fact that a condition of an object to be picked up is sensitive to not only said light and shade ratio, i.e., the contrast of the dark area and the bright area, but also the proportions of whole the object occupied by these areas, respectively, the present invention provides a photometric circuit permitting the light measuring modes to be selectively converted and, at the same time, permitting a video signal of the same level to be obtained even when the light measuring mode conversion takes place so far as the no contrast state is concerned.

FIG. 2(a) shows a test pattern in which a central blank area represents a bright area and a shaded area surrounding said blank area represents a dark area. In this test pattern, a proportion of the whole object occupied by the bright area, i.e., the ratio of bright area $S_o$ is expressed by $$S_o = (a/b)^2 \times 100 \; (\%).$$

$S_o = 100 \; (\%)$ is established when the whole object is covered by the bright area and contains no dark area, i.e., in the no contrast state.

SUMMARY OF THE INVENTION

Accordingly, it is a primary object of the present invention to provide a photometric control circuit for automatically adjusting the diaphragm of the objective lens of a closed circuit television (CCTV) camera which takes into account the contrast of the dark and light areas of an object to be picked up.

It is a further object of the present invention to provide a photometric control circuit for the diaphragm in a CCTV camera with the capability of selecting either the dark or light areas of the object as the primary area of interest in forming the object image.

The objects of the present invention are fulfilled by providing a photometric circuit incorporated in the objective lens assembly, provided with an automatic diaphragm for a closed circuit television (CCTV) camera, including an inverting amplifier adapted to amplify and invert video signals coming from the television camera with respect to a reference voltage and a rectifier adapted for voltage doubling rectification of video signals inversely amplified by said inverting amplifier so that video signals thus processed are compared with separately provided reference voltages to obtain diaphragm control signals to open or close the diaphragm. The photometric circuit includes in said inverting amplifier, a limiter having, in parallel to a variable resistance adapted for adjustment of the amplification degree, a diode functioning to limit a negative portion of the amplified and inverted video signal and a variable resistance for current control of said diode.

BRIEF DESCRIPTION OF THE DRAWINGS

The objects of the present invention will become more fully apparent and understood by reference to the detailed description given hereinbelow and the accompanying drawings, which are given by way of illustration only, and thus are not limitative of the present invention and wherein:

FIG. 1 is a circuit diagram illustrating an embodiment of the control circuit according to the present invention;

FIG. 2(a) is a diagram illustrating the relationship between a test object to be picked up and a corresponding waveform of a video signal to be input to the control circuit of FIG. 1;

FIGS. 2(b) and 3 are diagrams illustrating a signal waveform appearing at the output terminal $P_1$ in the circuit of FIG. 1;

DETAILED DESCRIPTION OF THE INVENTION

Figure 4A:
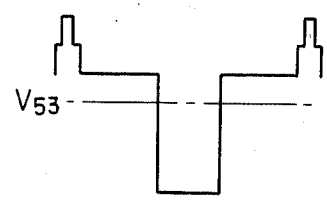
FIGS. 4(a) and 4(b) are diagrams illustrating a signal waveform before and after rectification in a peak light measuring mode by the circuit of FIG. 1.
Figure 5A:
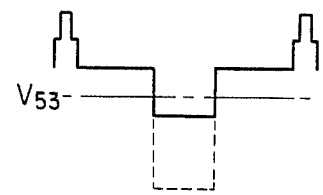
FIGS. 5(a) and 5(b) are diagrams illustrating a signal waveform before and after rectification in an average light measuring mode by the circuit of FIG. 1.

The present invention will now be described by reference to an embodiment as shown by the accompanying drawings.

FIG. 1 is a circuit diagram illustrating an embodiment of the present invention. Reference numeral 1 designates a video signal input terminal applied with a video signal $V_{in}$ coming from the television camera and connected via a capacitor 2 to an inverting amplifier I, including an operational amplifier 3. At an output terminal 33 of said inverting amplifier I, an amplified and inverted video signal (inverted signal) $V_{33}$ containing no DC components appears. The video signal input terminal 1 is also connected by a resistance 4 to ground.

Figure 6:
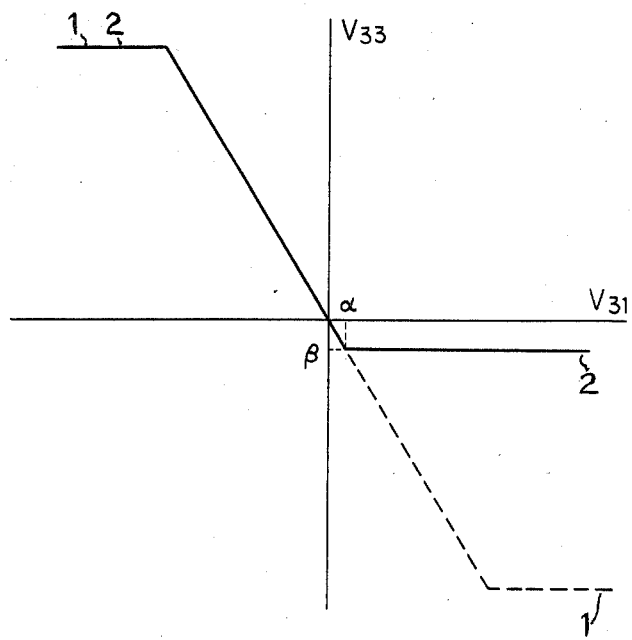
FIG. 6 is a diagram showing an input and output characteristic line of the inverting amplifier of FIG. 1.

The inverting amplifier I includes the operational amplifier 3 having its input terminal 31 connected via a resistance 5 to said capacitor 2, its noninverting input terminal 32 connected via a resistance 7 to a reference voltage input terminal 6, and its output terminal 33 connected via a variable resistance 8 adapted for regulation of amplification degree to said noninverting input terminal 31. Thus, the inverting amplifier I functions to, on the basis of the voltage supplied from the reference voltage input terminal 6, amplify and invert the video signal having its DC component already eliminated by the capacitor 2, and its amplification degree is variable by adjusting said variable resistance 8. Reference symbol A designates a limiter provided in parallel to said variable resistance 8 to limit the negative output of the video signal inversely amplified by the operational amplifier 3. This limiter A consists of a diode 9 and a variable resistance 10 adapted to control electric current flowing through said diode 9, in which the inverting input terminal 31 of the operational amplifier is connected to an anode of the diode 9 while a cathode of said diode 9 is connected via a variable resistance 10 to the output terminal 33 of said operational amplifier 3. This limiter A is arranged, as shown by solid line ② in FIG. 6, so that the negative side of the output voltage from the operational amplifier 3 is forcibly suppressed by the diode 9. Referring to FIG. 6, the abscissa represents an input voltage $V_{31}$ at the inverting input terminal 31 of the operational amplifier 3 and the ordinate represents the output voltage $V_{33}$ appearing at the output terminal 33. Said limiter A functions so that the negative side of the output voltage $V_{33}$ corresponding to the input voltage $V_{31}$, which would otherwise exhibit the input and output characteristic as shown by broken line ① as said input voltage $V_{31}$ increases in excess of $\alpha$, may be maintained constant at a level $\beta$ as shown by solid line ②.

Reference numeral II designates a rectifier adapted for voltage doubling rectification of the video signal $V_{33}$ inversely amplified by said inverting amplifier, and comprises a capacitor 11 for voltage doubling connected to the output terminal 33 of said operational amplifier 3 and a diode 12 via which an output terminal $P_2$ of said capacitor 11 is connected to the reference voltage input terminal 6. A diode 13 also is serially connected to said output terminal $P_2$ of the capacitor 11 so that a DC diaphragm control signal may be obtained at an output terminal 15. Reference numeral 14 designates a capacitor connected to the output terminal of the diode 13 and grounded to smooth the rectified signal coming from said diode 13.

In the embodiment of the photometric circuit constructed as described above according to the present invention, it is assumed that a video signal $V_{in}$ of a waveform as shown in FIG. 2(b) corresponding to the test pattern of FIG. 2(a), is applied to the video signal input terminal 1. The video signal $V_{in}$ has its DC component eliminated by the capacitor 2 and, as a result, a signal $VP_1$ appearing at an output terminal $P_1$ has positive and negative areas with respect to the reference voltage which are equal to each other. This signal $VP_1$ is inversely amplified by the inverting amplifier I with respect to the voltage supplied from the reference voltage input terminal 6, basically as shown in FIG. 4(a). It should be noted here that, in FIG. 2(b), an upper rectangular portion of the waveform corresponds to the central bright area of an object to be picked up, as illustrated in the test pattern of FIG. 2(a), reference symbol $V_2$ represents a video level and reference symbol $V_s$ represents a synchronous level.

The amplification degree of the inverting amplifier I increases as the resistance value of the variable resistance 8 is adjustably increased, while said amplification degree decreases as said resistance value decreases. The amplification of the inverting amplifier I depends on the resistance value ratio of the resistance 5 and the variable resistance 8. Accordingly, the amplification degree may be regulated by adjustment of the variable resistance 8 to regulate the peak-to-peak amplitude $V_{p-p}$ of the inverted signal $V_{33}$ appearing at the output terminal 33 of the operational amplifier 3, and thereby achieve sensitivity regulation.

Figures 4B, 5B:
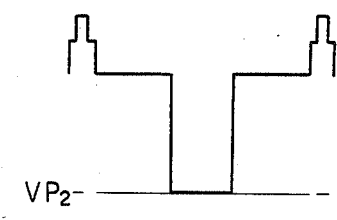

The variable resistance 10 of the limiter A may be adjusted to set the light measuring mode to a peak light measuring mode, an average light measuring mode or an intermediate light measuring mode. When the resistance value of the variable resistance 10 is adjusted to infinity, the limiter A is activated and, therefore, the reversed signal $V_{33}$ takes a waveform which is inverted compared to the signal $VP_1$ appearing at the output terminal $P_1$. Upon application of this inverted signal $V_{33}$ to the capacitor 11 of the voltage doubler II, the negative portion of this inverted signal $V_{33}$ changes the diode 12 to its conductive state and charges the capacitor 11. Then the plus portion thereof is additionally charged into said capacitor 11 so that a voltage doubled signal $VP_2$ appearing at the output terminal $P_2$ is DC regenerated without any change of the peak-to-peak amplitude $V_{p-p}$ as shown in FIG. 4(b). Thus, the voltage doubled signal $VP_2$ of the initial peak-to-peak amplitude $V_{p-p}$ is obtained, so the mode of light measuring is set to the peak light measuring mode in which the video level $V_2$ is detected, and the bright area is selected as the main object to be picked up. In the case where the resistance value of the variable resistance 10 in the limiter A is adjusted to zero, the diode 9 becomes conductive and the operational amplifier 3 is subjected to the limitation as shown in FIG. 6. More specifically, the input signal $V_{in}$ passes through the capacitor 2, appears as the signal $VP_1$ at the input terminal $P_1$, as shown in FIG. 3, and then is applied to the inverting amplifier I in which the portion of the signal increasing in excess of α (corresponding to the bright area) is clipped and an inverted signal $V_{33}$, indicated by a solid line ②, having no portion indicated by a broken line is formed (see FIG. 6). In consequence, even when the input signal $V_{in}$ contains a peak value, the resultant inverted signal $V_{33}$ having its portion indicated by a broken line on the negative side is clipped away and said peak value is correspondingly clipped away. When this reversed signal $V_{33}$ is rectified by the voltage doubler, the negative portion thereof turns the diode 12 to its conductive state, as in the case of peak light measuring and charges the capacitor 11. The subsequent positive portion of the waveform is added to the previously charged voltage. Thus, the voltage doubled signal $VP_2$, appearing at the output terminal $P_2$ is DC regenerated, as shown in FIG. 5(b). That is, the voltage doubled signal $VP_2$ is determined not by the peak-to-peak amplitude $V_{p-p}$, but a value substantially corresponding to an average value of the whole area of the object to be picked up having its negative portion of the signal clipped away. The above-described operation is the average light measuring mode in which the dark area is used as the primary object to be picked up. By adjusting said variable resistance 10 to an intermediate resistance value, the light measuring mode is converted to a mode intermediate of said peak light measuring mode and said average light measuring mode. In the embodiment shown, the diode 9 in the limiter A and the diodes 12, 13 in the voltage doubler are so selected that the temperature coefficients of these diodes cancel one another adequately to provide a circuit substantially free from any temperature influence.

Figure 7:
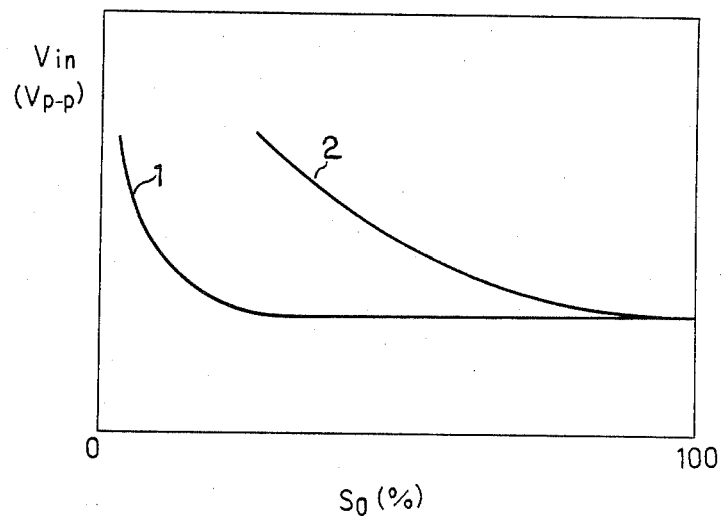
FIG. 7 is a diagram showing a photometric characteristic line expressed as a relationship of the area ratio $S_o$ versus a video signal $V_{in}(V_{p-p})$.

With the circuit constructed as has been described hereinabove in accordance with the present invention, sensitivity regulation can be achieved by adjusting the resistance B for regulation of the amplification degree in the inverting amplifier, while the light measuring mode can be selectively set to the peak light measuring mode, the average light measuring mode or the intermediate light measuring mode by adjusting the resistance 10 for current control of the diode 9 in the limiter. In both the average light measuring mode and the peak light measuring mode, the minus portion of the reversed signal $V_{33}$ is rectified by the voltage doubler and, as a result, the rectified signal level, i.e., the diaphragm control signal level, is identical in both modes, particularly in the state of the area ratio $S_o=100$ (%) or in the no contrast state. In consequence, there is provided, according to the present invention, an ideal photometric circuit, in which the video signal $V_{in}$ has an identical reference level in both the peak light measuring mode ① and the average light measuring mode ② as shown in FIG. 7. Furthermore, the negative side of the signal is under the effect of the limiter in the average light measuring mode so that no useless electric current flows, and thereby energy consumption is effectively saved.

It should be understood that the control circuit of the present invention may be modified as would occur to one of ordinary skill in the art without departing from the spirit and scope of the present invention.

What is claimed is:

1. An automatic control circuit for opening and closing the diaphragm of the objective lens of a video camera comprising:
    inverting amplifier means for receiving video signals output from said video camera and amplifying and inverting said signals;
    voltage doubler means for doubling and rectifying the signals output from said inverting amplifier means;
    reference signal generating means;
    diaphragm control means for comparing said reference signal with signals output from said voltage doubler means and opening or closing said diaphragm in response to the results of the comparison;
    means for clipping the negative going portion of signals output from said inverting amplifier; and
    light mode selector means for adjusting said means for clipping to control the degree of clipping performed on said signals.

2. The control circuit of claim 1, wherein said means for clipping comprises a diode coupled between an inverting input of said inverting amplifier and an output thereof.

3. The control circuit of claim 2, wherein said light mode selector means comprises a variable resistor in series with said diode.

* * * * *